United States Patent
Khosravi et al.

(10) Patent No.: US 11,916,699 B1
(45) Date of Patent: Feb. 27, 2024

(54) BACKBONE NETWORK TRAFFIC EFFICIENCY ANALYSIS

(71) Applicant: Amazon Technologies, Inc., Seattle, WA (US)

(72) Inventors: Atefeh Khosravi, Seattle, WA (US); Orlando Maldonado, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/474,390

(22) Filed: Sep. 14, 2021

(51) Int. Cl.
| | |
|---|---|
| *H04L 12/46* | (2006.01) |
| *H04L 43/0852* | (2022.01) |
| *H04L 41/22* | (2022.01) |
| *H04L 45/00* | (2022.01) |
| *H04L 45/74* | (2022.01) |

(52) U.S. Cl.
CPC .......... *H04L 12/4633* (2013.01); *H04L 41/22* (2013.01); *H04L 43/0852* (2013.01); *H04L 45/20* (2013.01); *H04L 45/742* (2013.01)

(58) Field of Classification Search
CPC . H04L 12/4633; H04L 41/22; H04L 43/0852; H04L 45/20; H04L 45/742
See application file for complete search history.

(56) References Cited

U.S. PATENT DOCUMENTS

| | | | | |
|---|---|---|---|---|
| 7,487,243 | B1* | 2/2009 | Zielinski | H04L 47/10 |
| | | | | 370/401 |
| 7,564,796 | B2* | 7/2009 | Loyd | H04L 43/0864 |
| | | | | 370/242 |
| 9,876,723 | B2* | 1/2018 | Sung | H04L 43/0858 |
| 10,225,103 | B2* | 3/2019 | Tumuluru | H04L 12/4633 |
| 10,250,685 | B2* | 4/2019 | Srinivasan | G06F 9/5044 |
| 10,511,522 | B2* | 12/2019 | Sung | H04L 47/2416 |
| 10,666,729 | B2* | 5/2020 | Tumuluru | H04L 43/103 |

OTHER PUBLICATIONS

Weifung Sun et al. "An Opportunistic Routing Mechanism Combined with Long-Term and Short-Term Metrics for WMN", The Scientific World Journal, vol. 2014, Article ID 432123, 11 pages. (Year: 2014).*

* cited by examiner

*Primary Examiner* — George C Neurauter, Jr.
(74) *Attorney, Agent, or Firm* — Klarquist Sparkman, LLP

(57) ABSTRACT

A backbone service exposes the efficiency of the backbone network using tunnels between any source-destination pairs. The efficiency can be calculated using a ratio of a transmission rate of the packets through a tunnel and a number of hops in the tunnel. The efficiency also can be tracked based upon services using the backbone network in a compute service provider environment. The data generated by the backbone service can be transmitted, stored or displayed for informational purposes to provide insights to service teams on how to improve efficiency in the backbone by change routing behavior, such as by moving caches, adding or removing hops or changing advertisements to network devices.

13 Claims, 8 Drawing Sheets

FIG. 5

EXAMPLE TUNNEL DATA 500:

| SOURCE DEVICE | DESTINATION DEVICE | PACKET TRANSMISSION RATE | TOTAL CAPACITY | TUNNEL HOPS |
|---|---|---|---|---|
| FRA | SFO | 65.80 | 180 | FRA-CDG<br>CDG-IAD<br>IAD-CMH<br>CMH-SFO |

• • •  510

BACKBONE NETWORK TRAFFIC EFFICIENCY ANALYSIS

BACKGROUND

Traffic on the Internet has grown dramatically over the last decade and continues to grow. Routers play a critical role in sustaining that growth. Data to be passed by routers is generally divided into a series of packets that can be transmitted between devices. Packets include control information and payload data. The control information corresponds to information used by a communication network to deliver the payload data. For example, control information can include source and destination network addresses, error detection codes, packet sequencing identification, and a time-to-live (TTL) parameter. Typically, control information is found in packet headers included within the packet and adjacent to the payload data.

Network routers can be used to forward data packets from a source computing device to a destination computing device in a computer network. In larger networks, a data packet may be routed through multiple routers before reaching its ultimate destination. When one router transmits a data packet to a neighboring router in the network, the transfer can be referred to as a "hop." When a router receives a data packet and identifies a neighboring router to which the data packet should be transmitted, it can be said to have identified a "next hop" for the data packet. At least some routers are configured to determine next hops for data packets using routing tables. A routing table can be used to determine associations between network address prefixes and next hops to which data packets matching the network address prefixes should be routed. Network routing protocols exist that enable routers to build routing tables and converge on a shared network topology. Example routing protocols include the Border Gateway Protocol (BGP), the Open Shortest Path First protocol (OSPF), and the Intermediate System to Intermediate System protocol (IS-IS).

Data packets typically pass through multiple hops to traverse a backbone network, which can span multiple geographic regions. Large traffic flows spanning multiple hops can place a high burden on the backbone network. Efficiency is improved when less hops are traversed. Different techniques can be used to increase efficiency, but knowing that efficiency can be improved in the first place can be problematic.

BRIEF DESCRIPTION OF THE DRAWINGS

FIG. 5 is an example of tunnel data collected for the backbone network of FIG. 1, wherein the tunnel data includes multiple hops for different tunnels in the backbone network.

DETAILED DESCRIPTION

Service teams have previously been given little insights into efficiency of a backbone network. The backbone can dynamically change and can be difficult to track due to link/device failures, capacity additions/removals, link/device maintenance, demand growth, topological changes, new site builds, etc. A backbone service exposes the efficiency of the backbone network using tunnels between any source-destination pairs. The efficiency can be calculated using a ratio including a transmission rate of the packets through a tunnel and a number of hops in the tunnel. The efficiency also can be tracked based upon services using the backbone network in a compute service provider environment. The data generated by the backbone service can be transmitted, stored or displayed for informational purposes to provide insights to service teams on how to improve efficiency in the backbone by change routing behavior, such as by moving caches, adding or removing hops or changing advertisements to network devices.

Figure 1:
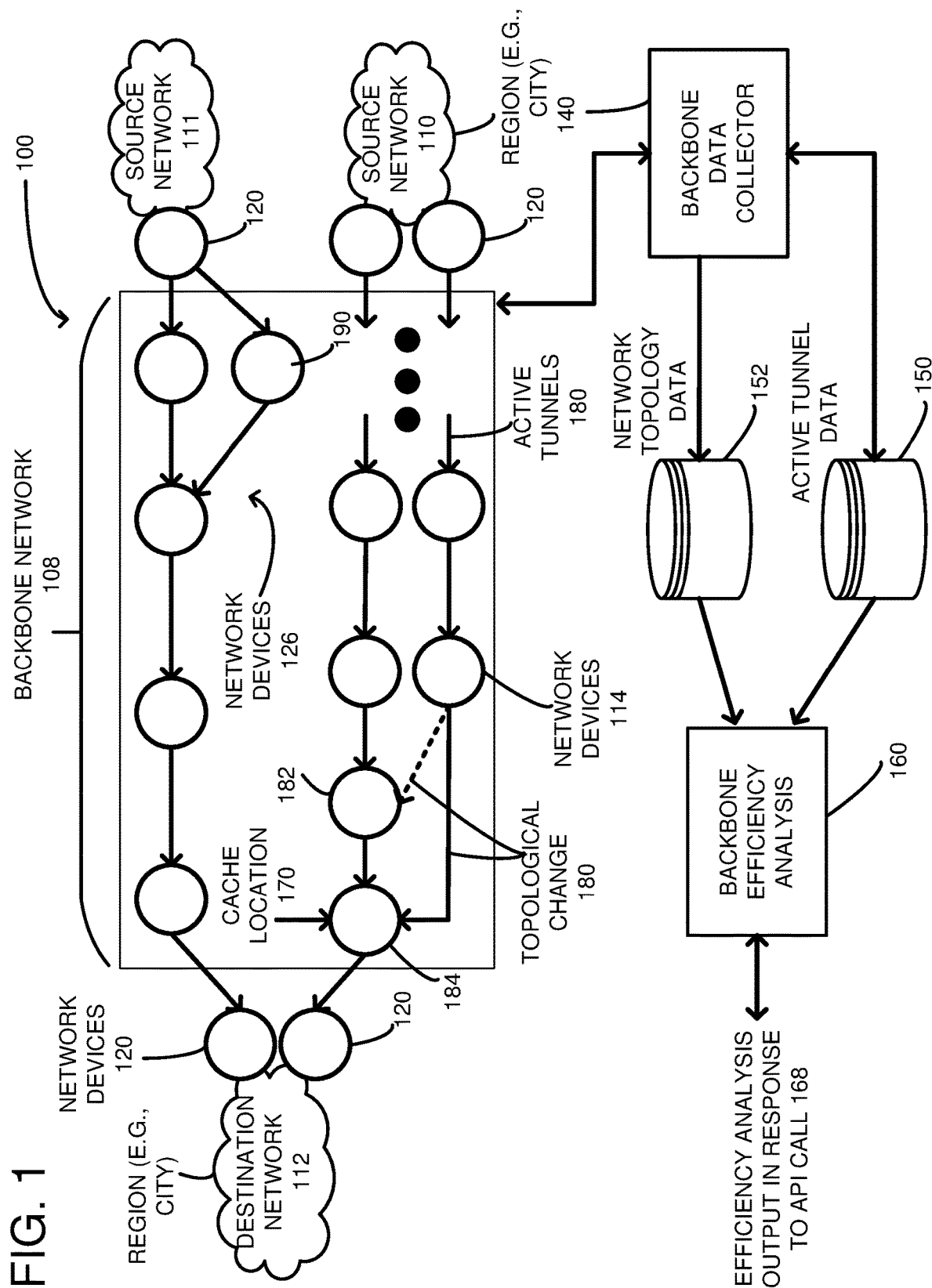
FIG. 1 is an example system diagram including a backbone network coupling multiple source networks to a destination network and a server computer that performs an efficiency analysis of the backbone network.

FIG. 1 shows a system 100 including a backbone network 108 coupling source networks 110 and 111 to a destination network 112. Generally, the source networks 110, 111 can be associated with regions or cities (e.g., New York, Boston), which are geographically distant from the destination network 112, which can be a different region or city (e.g., San Francisco). One or more network devices, shown generally as circles (such as at 120), can be considered part of the source networks 110, 111 and destination network 112, respectively. Alternatively, the network devices 120 can be considered part of the backbone network 108. Additional network devices, such as shown generally at 126, form the backbone network 108.

A backbone data collector 140 is coupled to the backbone network 108 and can collect various metrics, such as current traffic levels, transmission rates of packets (Gigabits/sec (Gbps)) associated with network interfaces, network latency associated with network interfaces, packet loss per network interface, etc. The collected data can be stored in a database 150 associated with tunnels that are propagating through the backbone. Network topology data can be stored in a database 152, which is also coupled to the backbone data collector 140 and can include information such as hops in a tunnel, available paths between network devices and total capacity of the paths. The network topology data 152 can be updated by the backbone data collector, including when links are taken out of service, when links are moved to different hops, etc. A backbone efficiency analysis service 160 uses the network topology data 152 and the active tunnel data 150 to determine backbone efficiency. Efficiency measures how optimally traffic is being transmitted over the backbone. The efficiency measurement is meant to surface further improvements that can be made over the backbone that are not visible by analyzing an average number of hops. The backbone efficiency analysis service 160 can be responsive to API calls 168 in order to provide efficiency metrics between the source networks 110, 111 and the destination network 112. Such efficiency metrics can be used to display an efficiency of the backbone with respect to one or more services associated with a compute service provider.

In order to evaluate the backbone efficiency, the backbone service 160 uses tunnels that are active between the source networks 110, 111 and the destination network 112. Active tunnels are shown as arrows, such as arrow 180, between the network devices 126. Active tunnels means that a stream of packet transmissions is in progress. The efficiency of the backbone is a function of the number of hops through which the tunnel passes and the transmission rate of the data in the tunnel.

Efficiency for the backbone network can be defined as:

$$\text{efficiency} = \frac{y}{y\_weighted},$$

where
   $y$ is the total traffic being sent from all sources to all destinations and is defined as:

$y = \Sigma_{d \in D} \Sigma_{z \in S} y_{s,d}$, $y_{weighted}$ is the total traffic transmitted over backbone hops from all sources to destinations and is defined as:

$y_{weighted} = \Sigma_{d \in D} \Sigma_{z \in S} h_{s,d} y_{s,d}$, $y_{s,d}$ is total traffic from source s to destination d, which can further be expanded by contributing services as:

$y_{s,d} = \Sigma_{k \in K} y_{s,d}^{k}$.

Note that $y_{weighted} \geq y$ and therefore efficiency is in range between 0 and 1.

Further terms are defined as follows:
S is the set of sources in the network with size $|S|=N$,
D is the set of destinations in the network with size $|D|=M$,
K is the set of services in the network,
$h_{s,d}$ is the number of hops from source s to destination d.
$y_{s,d}^{k}$ is the traffic between source s and destination d carrying traffic belonging to service k.

Tunnel data is used to obtain the number of backbone hops, $h_{s,d}$, between source s to destination d. In calculating $h_{s,d}$, the average number of hops can be used between s and d.

If the efficiency is zero, it means all the incoming traffic goes through infinite hops in the backbone network and never gets to destination. If the efficiency is equal to 1, it means the routing is perfectly efficient and all the incoming traffic is coming from regions one-hop away. The objective is to maximize efficiency and obtain a number close to 1.

Consider a scenario where traffic data is received in a destination region d1 from source regions s1 and s2, being 1 and 4 hops away, respectively. Tables 1 and 2 show total traffic from each source region to d1, in the Gbps column, and how many hops each source is away from the destination, num_of_hops column, on two different days, t1 and 2.

TABLE 1

Traffic from source regions to destination on t1.

| Datetime | srcRegion | dstRegion | Gbps | num_of_hops | avg_num_of_hops | weighted_Gbps | efficiency |
|---|---|---|---|---|---|---|---|
| t1 | s1 | d1 | 40 | 1 | 3 | 40 | 0.36 |
| t1 | s2 | d1 | 60 | 4 | 3 | 240 | |

TABLE 2

Traffic from source regions to destination on t2.

| Datetime | srcRegion | dstRegion | Gbps | num_of_hops | avg_num_of_hops | weighted_Gbps | efficiency |
|---|---|---|---|---|---|---|---|
| t2 | s1 | d1 | 70 | 1 | 3 | 70 | 0.53 |
| t2 | s2 | d1 | 30 | 4 | 3 | 120 | |

On day t2, 50% of traffic being fetched from s2 has moved to s1. This makes more traffic being fetched from s1, which is closer to d1. Calculating efficiency metric for both days, results in the following:

$$t1: \text{efficiency}_{d1} = \frac{40+60}{40+240} = \frac{100}{280} = 0.36$$

$$t2: \text{efficiency}_{d1} = \frac{70+30}{70+120} = \frac{100}{190} = 0.53$$

On t1 efficiency is 0.36, meaning routing is 36% efficient and (100-36=)64% of the traffic being routed over the backbone is the overhead of extra hops taken to reach to destination. On t2 and after more traffic has been moved to s1 efficiency has improved by ~47% comparing to t1. However, the average number of hops for both days remains the same with the value of 3.

Based on the above example, the average number of hops metric is seen as tied to topological improvements. On the other hand, efficiency metric takes into account further improvements achieved by optimal transmission over the backbone network. Additionally, the efficiency calculation can associate a weight with each tunnel or with each number of hops. Thus, for example, some tunnels can be weighted differently than other tunnels based upon importance. For example, for some traffic that is considered critical, the weight can be adjusted to ensure that the traffic can continue without any necessary modifications to the network. By contrast, other traffic that is considered less important can be weighted more heavily such that network modifications are encouraged. The weighting can also be related to services offered by a cloud provider, wherein some services are weighted differently than other services. Continuing with the above example, the denominator values of 40+240 can be changed to x*40+y*240, where x and y are different weights associated with the number of hops, respectively.

Returning to FIG. 1, the efficiency metric can be used to change the backbone network 108. For example, a cache 170 can be added to a network device located near the destination network 112. In this way, less traffic needs to traverse the network hops between the source 110 and the destination 112. As an alternative modification, as shown at 180, a topological change can be made to change a link from hop 182 to hop 184. The result is that the number of hops between the source 110 and the destination 112 is reduced, which increases efficiency in the backbone network. Another technique (not shown) is to change advertisements used to modify the hop count. Adding hops can also increase efficiency. For example, adding hop 190 allows the network traffic to be spread across different paths.

Thus, the backbone service 160 can analyze the data received from the various databases 150, 152 to determine a backbone efficiency. The efficiency can be transmitted as a response to an API or otherwise be displayed to a user as a function of time or as a function of services so that the user has a better understanding of efficiency of the backbone network.

Figure 2:
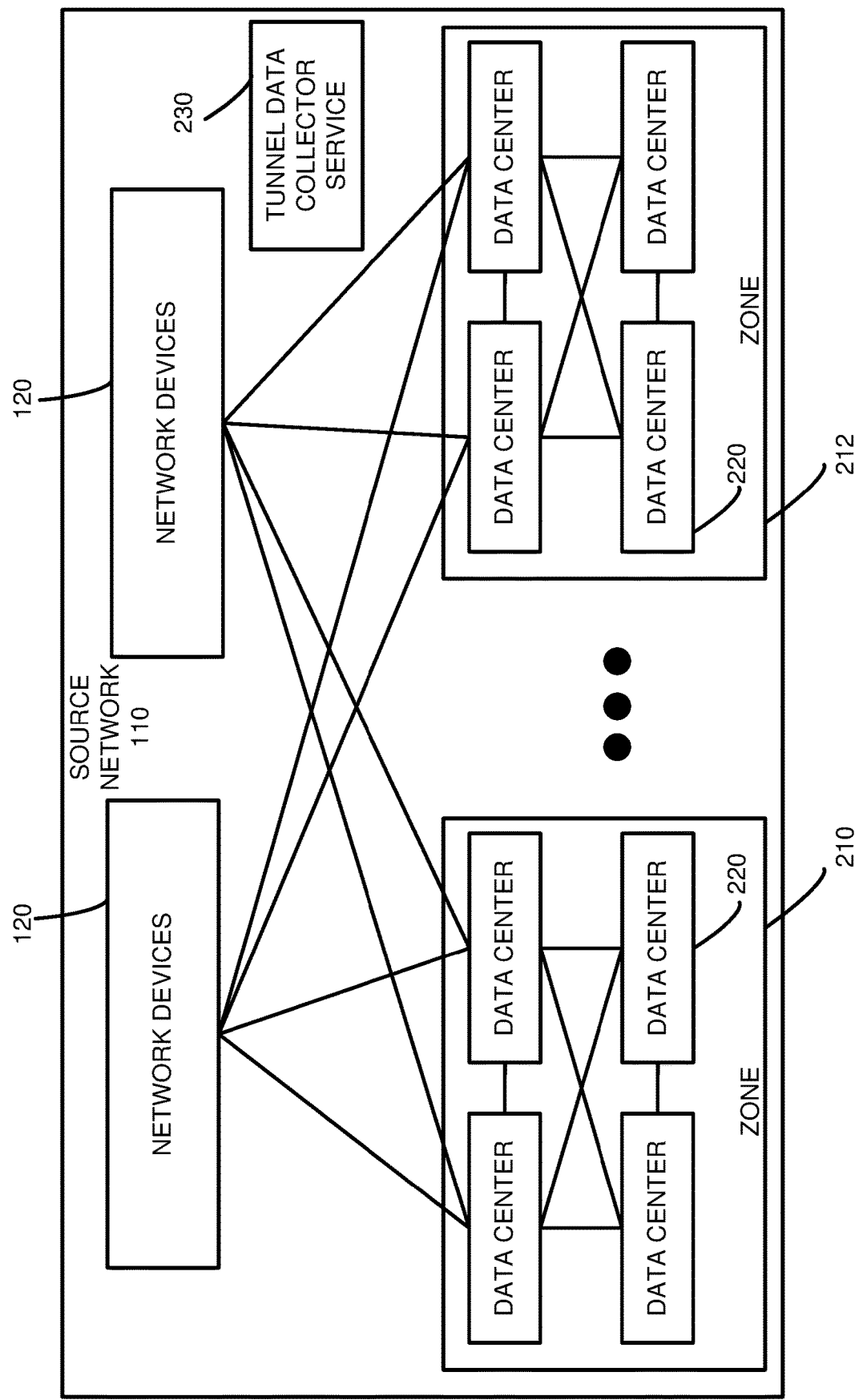
FIG. 2 is an example of one of the source networks of FIG. 1.

FIG. 2 is an exemplary diagram of the source network 110, which includes two or more of the network devices 120. Typically, the source network 110 is associated with a large city, such as Portland or Seattle. Alternatively, the source network can be associated with a state, a group of states, a country, or another geographic designation. The network devices 120 are shown as part of the source network 110 but can be considered part of the backbone network 108. The source network 110 includes a cluster of data centers divided into logical groups called zones, such as zones 210, 212. The zones 210, 212 are generally isolated and physically separated from other zones and are typically within different geographic areas. Within a zone, one or more discrete data centers, generically shown at 220, have redundant power, networking and connectivity. A tunnel data collector service 230 communicates with the data centers 220 to obtain data about tunnels that are formed for transmission of packets to the network devices 120. The tunnel data collector service 230 can provide such tunnel data to the backbone data collector 140 and/or can populate the active tunnel database 150 (FIG. 1). The tunnel data indicates packets being transmitted to and from network devices within the data centers 220 via an active tunnel, such that packets are encapsulated for transmission over the backbone 108. Additionally, a tunnel transmission rate can be included in the tunnel data, such as in Gbps.

Figure 3:
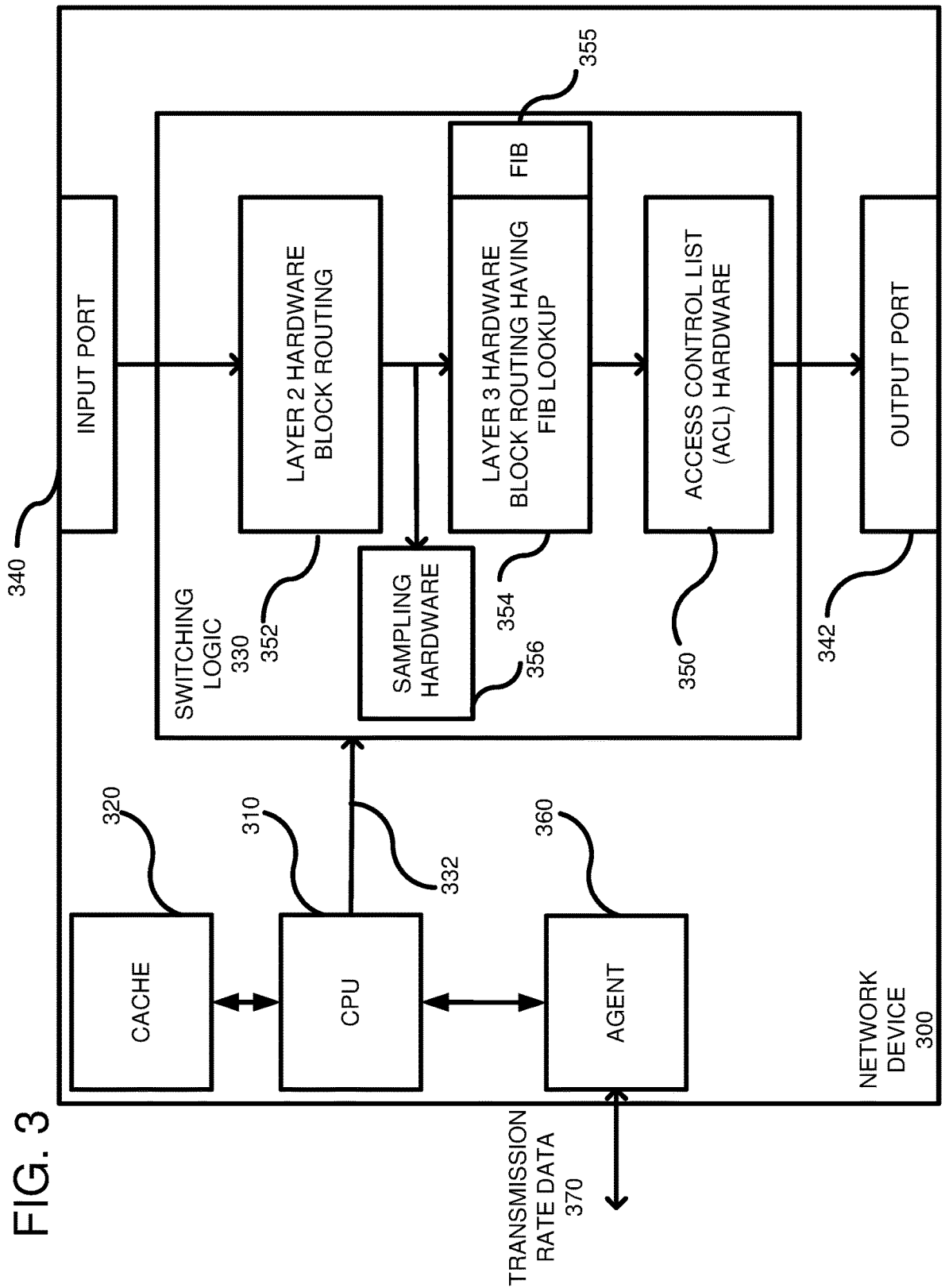
FIG. 3 shows a network device used as a hop in the backbone network of FIG. 1.

FIG. 3 shows a detailed example of an embodiment of the network device 300. Network device 300 is a switch that routes packets to a next hop in the network using a destination IP address. The network device 300 is an example of any of the hops shown in FIGS. 1-2. A CPU 310 is coupled to a cache memory 320 and to switching logic 330 through a bus 332 (PCIe or other protocols and bus types can be used). The cache memory 320 can be used as the cache location 170 shown in FIG. 1. The switching logic 330 is positioned between an input port 340 and an output port 342, which are typically adapted to receive network cables, such as Ethernet cables. Although only one input port 340 and one output port 342 are shown, typically there are multiple ports (also called interfaces) on a network device. The switching logic 330 can be a single ASIC integrated circuit or divided into multiple integrated circuits. The switching logic 330 can include multiple different hardware logic blocks including a layer 2 hardware block 352, a layer 3 hardware block 354, and an Access Control List (ACL) hardware block 350. The layer 2 hardware block 352 relates to an Ethernet layer and can forward packets based on MAC tables. The layer 2 lookup ensures that an incoming packet's MAC address equals the MAC address of the network device 300. If so, then the packet can proceed onto the layer 3 hardware. If not, then the layer 3 lookup does not occur. The layer 3 hardware block 354 relates to forwarding based on the longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a FIB 355, which includes destination addresses (e.g., prefixes) for packets being transmitted through the switching logic and associated ports for forwarding the packets. The network device 300 can run routing protocols, such as an Open Shortest Path First (OSPF) or a Routing Information Protocol (RIP), to communicate with other Layer 3 switches or routers. The routing tables are used to lookup the route for an incoming packet. The ACL block 350 relates to permissions and can include rules whether to drop packets. The different hardware blocks can be coupled in series and additional hardware blocks can be added based on the design. Packets pass from the input port 340 to the output port in accordance with the configuration of the hardware logic blocks 350, 352, 354, which are considered a switching pipeline. The input port 340, output port 342 and switching logic 330 can be considered a data plane or forwarding plane of the network device 300. By contrast, the CPU 310, cache memory 320, and an agent 360 are considered part of a control plane. Sampling hardware 356 can be provided anywhere in the switching pipeline and periodically (fixed time intervals) or randomly samples packets passing through the network device 300. The sampling hardware 356 is shown in between the layer 2 and layer 3 hardware but can be situated at other locations. As shown, the agent 360 can execute on the CPU 310 and can be used to receive sampled packets from the sampling hardware 356 and transmit packet header data to the collector, such as collector 230 (FIG. 2), as indicated at 370. The agent 360 can either strip the payload and only send the header data or can transmit the full packet to the collector server computer. The agent 360 can further add a timestamp to the packet and transmit a transmission rate for packets passing through the output port 342. Although this embodiment shows the sampling hardware 356, the function of the sampling hardware can be performed in software, such as within the agent 360. Additionally, packets sent to the backbone data collector 140 (FIG. 1) can be sampled using export technology (e.g., Netflow) or can be a copy of all packets (or just headers) traversing the network device interfaces using packet mirroring technology. When requests are made for data available in the cache 320, the agent 360 can ensure that data in the cache 320 is transmitted to the requestor. For example, if the destination network 112 (FIG. 1) requests data from the source network 110, and the requested data is in the cache 320, then the network device can transmit the cache data without sending the request to the source network.

Figure 4:
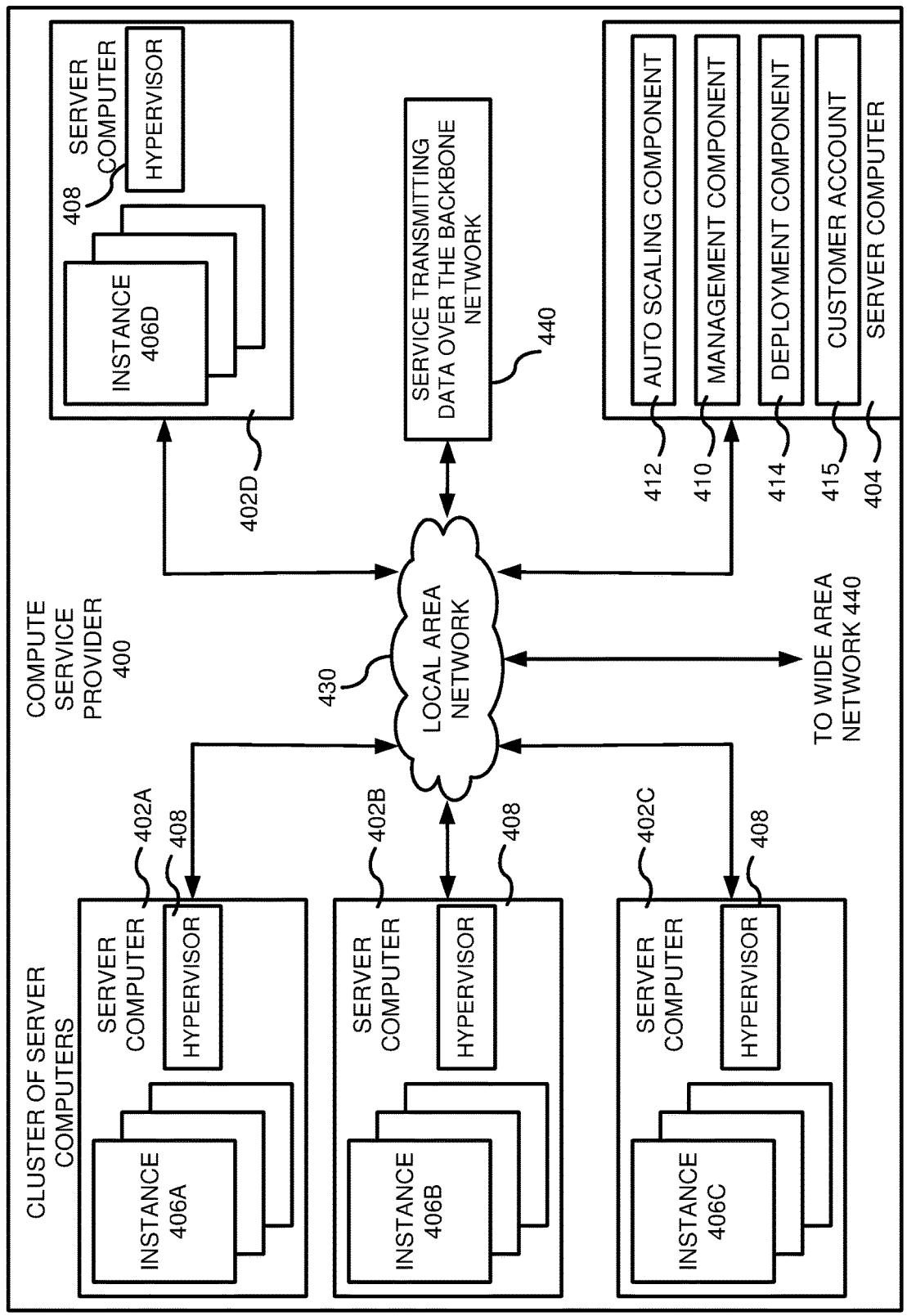
FIG. 4 is an example system diagram showing a plurality of virtual machine instances running in the multi-tenant environment and a service that transmits data over the backbone of FIG. 1.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

In some implementations of the disclosed technology, the computer service provider 400 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

A service 440 operating one or more server computers in the compute service provider 400 can transmit data over the backbone network, such as the backbone network 108 (FIG. 1). In one example, the environment shown can be within a data center 220 (FIG. 2) within the source network 110. As such, the backbone data collector 140 can track packets transmitted by the service 440 using the IP address of the service 440 and can determine the efficiency of such transmissions over the backbone network. The backbone efficiency analysis service 160 (FIG. 1), can then make suggestions to administrators how to increase efficiency of the service. Some examples include changing a location of cache, adding additional cache, changing a topology of the backbone, and/or updating advertisements. Additional services can be added so that the backbone efficiency analysis service tracks efficiency of the backbone for multiple services.

FIG. 5 illustrates an example of a tunnel data 500, which can be sent from the backbone data collector 140 or the tunnel data collector service 230 to the databases 150, 152. The tunnel data 500 can include a source and destination node (e.g., a network zone) name, tunnel header information (not shown), and a list of next hops. Each next hop can include the next hop node name, the egress logical port to reach the next hop, and a weight. The weights can be simple integer relative weights that indicate the proportion of traffic that can egress to the next hop. Further information can be associated with each tunnel such as a reserved bandwidth, and a total capacity of the interconnections between various transit centers. Although only one entry is shown in the tunnel data 500, other entries are included as indicated by the repeating dots 510.

Figure 6:
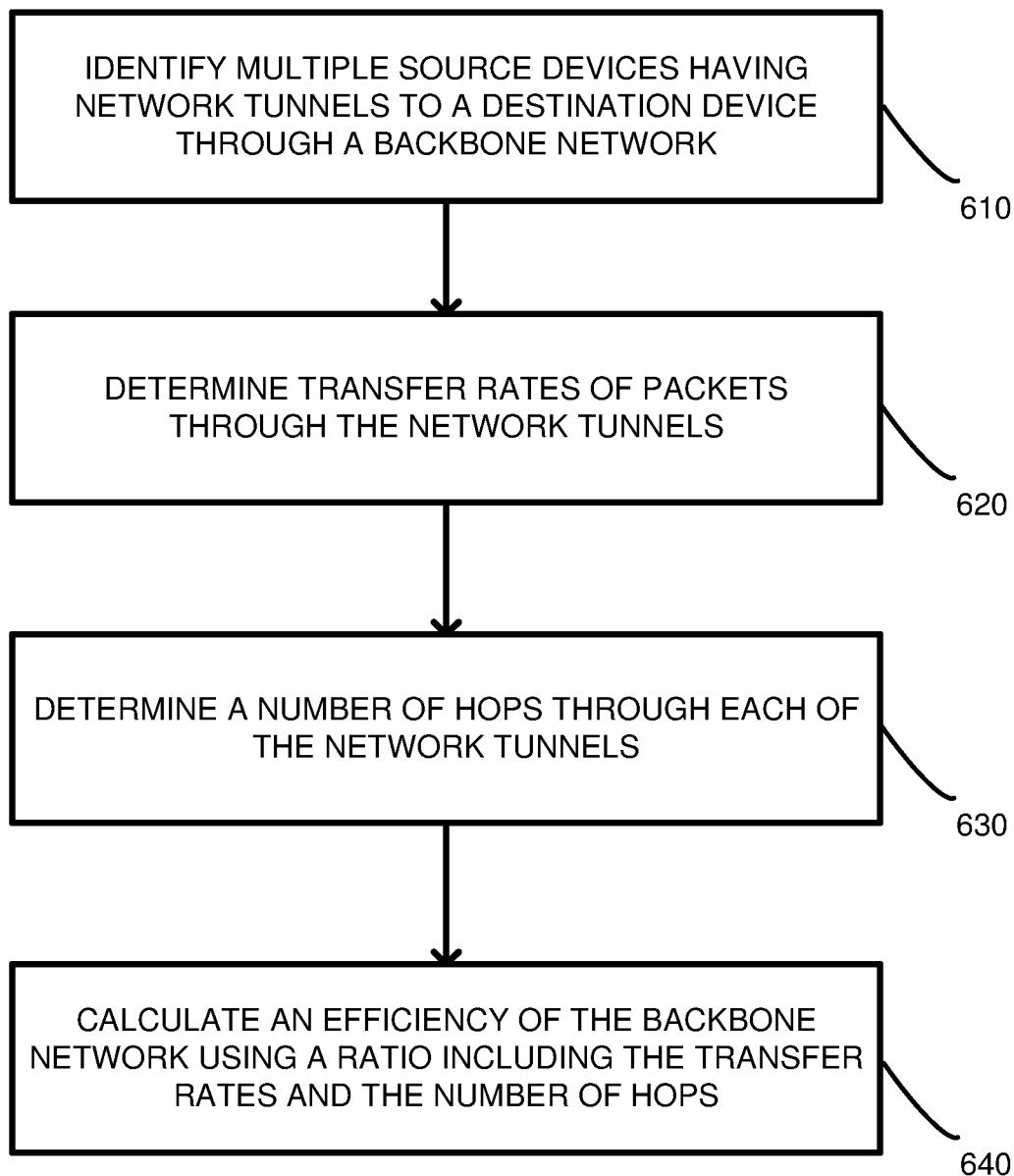
FIG. 6 is a flowchart according to a first embodiment for determining efficiency in the backbone network of FIG. 1.

FIG. 6 is a flowchart according to one embodiment for increasing efficiency in a backbone network. In process block 610, multiple sources can be identified having network tunnels to a destination device through a backbone network. For example, in FIG. 1, multiple tunnels are shown passing through the backbone network 108 from the source networks 110, 111. The tunnels can be found by searching for the destination device in a database, such as shown in FIG. 5, and identify the different source devices transmitting packet data to the destination device. Additionally, the tunnel hops can be identified in the database. In process block 620, a transmission rate of the packets through the tunnels can be determined. For example, in FIG. 3, a transmission rate can be determined using sampling hardware 356 and an agent 360 can send the transmission rate to the backbone data collector 140 for use by the backbone efficiency analysis server 160. In process block 630 a number of hops through each of the network tunnels is determined. Once the tunnel data is identified in FIG. 5, a count of the identified hops can be made. In process block 640, an efficiency is calculated using a ratio including the transfer rates and the number of hops. For example, an efficiency can be determined using the following formula as described above:

$$\text{efficiency} = \frac{y}{y\_weighted},$$

Figure 7:
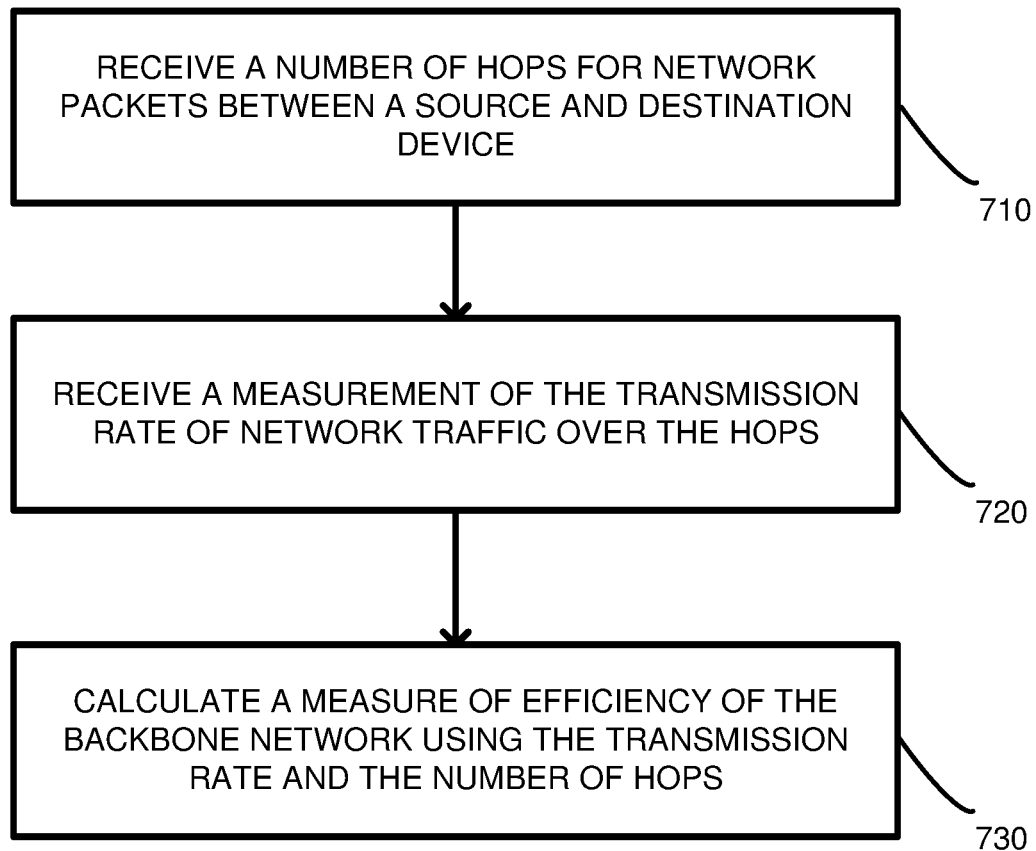
FIG. 7 is a flowchart according to a second embodiment for determining efficiency in the backbone network of FIG. 1.

FIG. 7 is a flowchart according to another embodiment for determining efficiency in a backbone network. In process block 710, a number of hops is received for network packets between a source and a destination device. For example, in FIG. 1, a number of hops can be determined between a source network 111 and destination network 112 through the backbone network 108. In process block 720, a measurement of the transmission rate can be received for packets being transmitted over the hops. The transmission rate can be received from the network devices themselves, such as by the sampling hardware 356 in FIG. 3. The transmission rate can be targeted to IP addresses associated with the destination device. The agent 360 can then send the transmission rate to the tunnel data collector service 230, which, in turn, can transmit the information to the backbone data collector 140. In process block 730, a measure of efficiency is calculated using the transmission rate and the number of hops. For example, a ratio between the transmission rate and the number of hops can be used, as described above. In one example, the efficiency can be determined using the following formula: [Gbps (source 1)+Gbps (source 2)]/[Gbps (source 1)*hops1+Gbps(source 2)*hops2].

Figure 8:
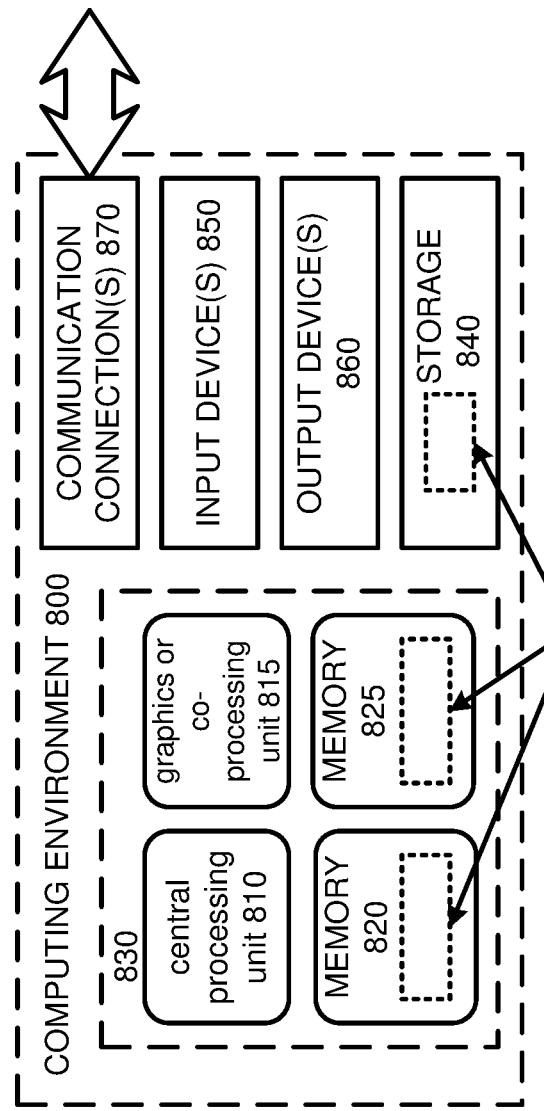
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). In one example, the computing environment 800 can be used to implement the backbone efficiency analysis server 160.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of increasing efficiency in a backbone network for network traffic, the method comprising:
    identifying multiple source devices having network tunnels to a destination device through the backbone network;
    determining transmission rates of packets through the network tunnels by sampling packets passing through one or more network switches that are within a first of the network tunnels;
    determining a number of hops through each of the network tunnels;
    calculating an efficiency of the backbone network using a ratio including the transmission rates and the number of hops, wherein the calculating of efficiency further includes different weights applied to each network tunnel; and
    based upon the calculated efficiency, modifying the first network tunnel by reducing the number of hops forming the first tunnel and by configuring a cache near or at the destination.

2. The method of claim 1, wherein the calculating of the efficiency includes multiplying the transmission rate by the number of hops.

3. The method of claim 1, wherein the calculation of the efficiency includes using a formula including the following: efficiency=$y/y_{weighted}$, wherein y is a summation of transmission rates for multiple streams of network traffic from different sources to the destination and y weighted is a multiplication of the number of hops and the transmission rates.

4. A system, comprising:
    a plurality of network devices including interfaces used in switching network traffic, wherein the plurality of network devices form a backbone network through which the network traffic is transmittable; and
    one or more server computers operable to perform the following:
    identify multiple tunnels through the plurality of network devices between a source device and a destination device;
    determine a transmission rate of packets through the multiple tunnels by sampling packets passing through the plurality of network devices using sampling hardware in the plurality of network devices;
    determine a number of hops through each of the multiple tunnels;
    calculate an efficiency of the backbone network using a ratio including the transmission rate and the number of hops, wherein the calculating of the efficiency is based upon a service offered by a cloud provider, wherein the service uses the source device to transmit data through the backbone network; and modifying at least one tunnel of the multiple tunnels by reducing the number of hops in the at least one tunnel based upon the calculated efficiency.

5. The system of claim 4, wherein the one or more server computers are further operable to perform the following: modify the backbone network based upon the calculation of the efficiency.

6. The system of claim 5, wherein the modifying includes configuring a cache near or at the destination.

7. The system of claim 4, wherein the calculating of the efficiency includes multiplying the transmission rate by the number of hops.

8. The system of claim 4, wherein the one or more server computers are further operable to perform the following: display the efficiency as a function of transmission rates, the number of hops or both.

9. A method of increasing efficiency in a backbone network for network traffic, the method comprising:

identifying multiple source devices having network tunnels to a destination device through the backbone network;

determining transmission rates of packets through the network tunnels by sampling packets passing through one or more network switches that are within a first of the network tunnels;

determining a number of hops through each of the network tunnels;

calculating an efficiency of the backbone network using a ratio including the transmission rates and the number of hops, wherein the calculating of efficiency further includes different weights applied to each network tunnel, wherein the calculation of the efficiency includes using a formula including the following: efficiency=$y/y_{weighted}$, wherein y is a summation of transmission rates for multiple streams of network traffic from different sources to the destination and $y_{weighted}$ is a multiplication of the number of hops and the transmission rates; and based upon the calculated efficiency, modifying the first network tunnel by reducing the number of hops forming the first tunnel.

10. The method of claim 9, wherein the calculating of the efficiency includes multiplying the transmission rate by the number of hops.

11. The method of claim 9, further including configuring a cache near or at the destination based upon the calculated efficiency.

12. The method of claim 9, wherein the calculating of the efficiency is based upon a service offered by a cloud provider, wherein the service uses one or more of the multiple source devices to transmit data through the backbone network.

13. The method of claim 9, wherein the modifying further includes modifying the backbone network based upon the calculation of the efficiency.

* * * * *